US008353755B2

(12) United States Patent
Vann et al.

(10) Patent No.: US 8,353,755 B2
(45) Date of Patent: Jan. 15, 2013

(54) WAGERING GAME WITH GAME-PLAY ENHANCEMENTS HAVING KNOWN EXPECTED VALUES

(75) Inventors: Jamie W. Vann, Chicago, IL (US); James V. Palermo, Chicago, IL (US); Jeremie D. Moll, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 198 days.

(21) Appl. No.: 12/822,655

(22) Filed: Jun. 24, 2010

(65) Prior Publication Data

US 2011/0045892 A1 Feb. 24, 2011

Related U.S. Application Data

(60) Provisional application No. 61/221,984, filed on Jun. 30, 2009.

(51) Int. Cl.
*A63F 13/00* (2006.01)

(52) U.S. Cl. .......................................... 463/20; 463/16

(58) Field of Classification Search .............. 463/16–30, 463/40–42; 273/292, 138.1
See application file for complete search history.

(56) References Cited

U.S. PATENT DOCUMENTS

| | | | | |
|---|---|---|---|---|
| 7,455,585 | B2 * | 11/2008 | Englman | 463/16 |
| 2005/0164774 | A1 | 7/2005 | Gauselmann | |
| 2005/0261055 | A1 * | 11/2005 | Casey et al. | 463/20 |
| 2005/0282620 | A1 * | 12/2005 | Marks et al. | 463/20 |
| 2005/0288094 | A1 * | 12/2005 | Marks et al. | 463/20 |
| 2006/0068893 | A1 * | 3/2006 | Jaffe et al. | 463/20 |
| 2006/0264254 | A1 * | 11/2006 | Aoki | 463/20 |
| 2007/0042824 | A1 * | 2/2007 | Randall | 463/16 |
| 2009/0075722 | A1 * | 3/2009 | Louie et al. | 463/20 |

OTHER PUBLICATIONS

Patent Examination Report from Australian Application No. 2010202690, 4 pages, Dated Sep. 10, 2012.

* cited by examiner

*Primary Examiner* — Masud Ahmed

(74) *Attorney, Agent, or Firm* — Nixon Peabody LLP

(57) ABSTRACT

A gaming system and method for conducting a wagering game includes a powerup feature. A wager input receives a wager from a player to play a single play of a wagering game. At least one display displays a plurality of reels with symbols. A controller is coupled to the wager input and the at least one display. The controller is operative randomly generate an outcome of the wagering game from a plurality of wagering game outcomes. The controller displays the randomly generated wagering game outcome on the plurality of reels. The plurality of outcomes includes the award of a powerup to a player. The powerup allows the player to activate a game enhancement feature on a future play of the wagering game. The plurality of wagering game outcomes can also include a credit award. A player may select the credit award or an offered powerup.

20 Claims, 7 Drawing Sheets

WAGERING GAME WITH GAME-PLAY ENHANCEMENTS HAVING KNOWN EXPECTED VALUES

RELATED APPLICATIONS

This application claims priority from U.S. Provisional Application No. 61/221,984, filed Jun. 30, 2009 and that application is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus and methods for playing wagering games, and more particularly to bonus powerups with associated enhancements that may be applied by a player for future plays of a wagering game.

BACKGROUND OF THE INVENTION

Gaming terminals, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

In order to attract players and achieve player loyalty to different games, game designers seek to make games interesting to the player. There are therefore continual challenges to develop different attractive features to a player in wagering games.

SUMMARY OF THE INVENTION

According to one example, a gaming system for conducting a wagering game includes a wager input for receiving a wager from a player to play a single play of a wagering game. At least one display to display a plurality of reels with symbols is provided. A controller is coupled to the wager input and the at least one display. The controller is operative to randomly generate an outcome of the wagering game from a plurality of wagering game outcomes. The controller displays the randomly generated wagering game outcome on the plurality of reels. The plurality of outcomes includes the award of a powerup to a player. The powerup allows the player to activate a game enhancement feature on a future play of the wagering game.

Another example is a gaming system that includes a wager input for receiving a wager from a player to play a single play of a wagering game. At least one display to display a plurality of reels with symbols is provided. A controller is coupled to the wager input and the at least one display. The controller is operative to randomly generate an outcome of the wagering game from a plurality of outcomes including a winning outcome. The controller also displays the randomly generated wagering game outcome on the plurality of reels and awards a credit award based on a winning outcome. A selection mechanism allows a player awarded a winning outcome to select between the credit award and a powerup allowing game enhancements if the powerup is activated in future plays of the wagering game.

Another example is a method of conducting a wagering game on a gaming system. The wagering game includes a game sequence in which a player makes a wager and a wagering game outcome is determined. The wagering game is conducted using a gaming apparatus to receive inputs from the player and to generate wagering game outcomes that are communicated to the player. The gaming apparatus includes a user interface device configured to receive an input from the player. The apparatus also includes one or more display devices configured to display information or graphics to be viewed by the player and one or more storage devices. One or more processors is configured to execute computer instructions relating to the wagering game. A player input is accepted at the user interface device and is transformed into electronic data signals indicative of a wager to play the wagering game. At least one of the gaming apparatus processors interpret the wager from the data signals and a recording of a digital representation of the wager is stored in at least one of the gaming apparatus storage devices. At least one of the gaming apparatus processors is used to initiate the game sequence of the wagering game on the gaming apparatus. The user interface device is used to activate the wagering game. At least one of the gaming apparatus processors causes at least one of the display devices to display a series of reels with symbols showing a randomly generated outcome of a plurality of outcomes of the wagering game. The plurality of outcomes includes an outcome to award a powerup allowing the player to activate a game enhancement feature on a future play of the wagering game.

Another example is a method of conducting a wagering game on a gaming system. The wagering game includes a game sequence in which a player makes a wager and a wagering game outcome is determined. The wagering game is conducted using a gaming apparatus to receive inputs from the player and to generate wagering game outcomes that are communicated to the player. The gaming apparatus includes a user interface device configured to receive an input from the player. The gaming apparatus also includes one or more display devices configured to display information or graphics to be viewed by the player, one or more storage devices, and one or more processors configured to execute computer instructions relating to the wagering game. A player input is accepted at the user input device and transformed into electronic data signals indicative of a wager to play the wagering game. At least one of the gaming apparatus processors is used to interpret the wager from the data signals and to, at least in part, cause the recording of a digital representation of the wager in at least one of the gaming apparatus storage devices. At least one of the gaming apparatus processors is used to initiate the game sequence of the wagering game on the gaming apparatus. The user interface device is used to activate the wagering game. At least one of the gaming apparatus processors is used to cause at least one of the display devices to display a series of reels with symbols showing a randomly generated outcome of a plurality of outcomes of the wagering game, the plurality of outcomes includes a winning outcome. A selection from a player awarded a winning outcome between the credit award and a powerup allowing game enhancements if the powerup is activated in future plays of the wagering game.

Additional aspects of the invention will be apparent to those of ordinary skill in the art in view of the detailed description of various embodiments, which is made with reference to the drawings, a brief description of which is provided below.

Figure 1A:
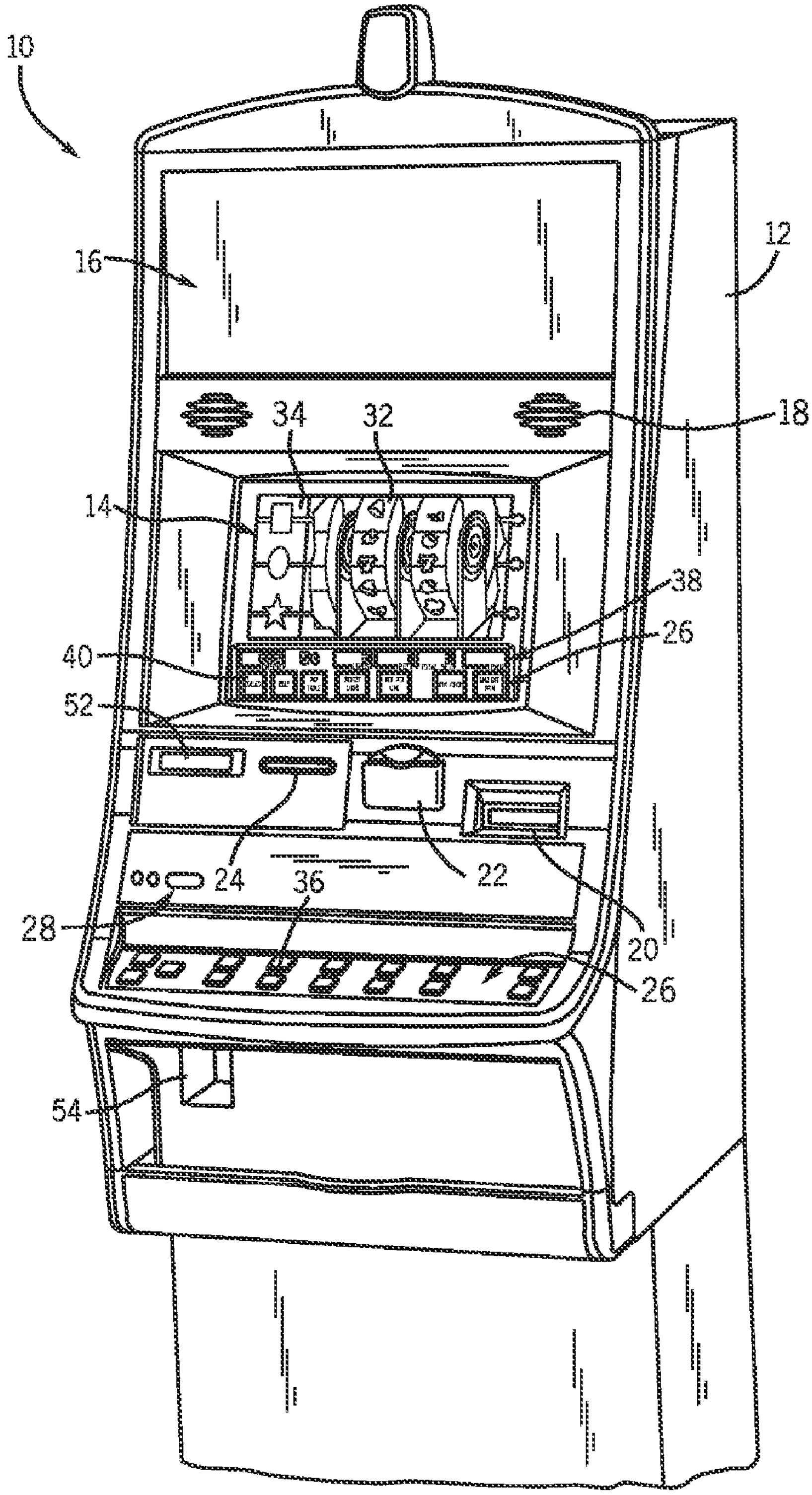
FIG. 1A PRIOR ART
FIG. 1*a* is a perspective view of a free-standing gaming terminal.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
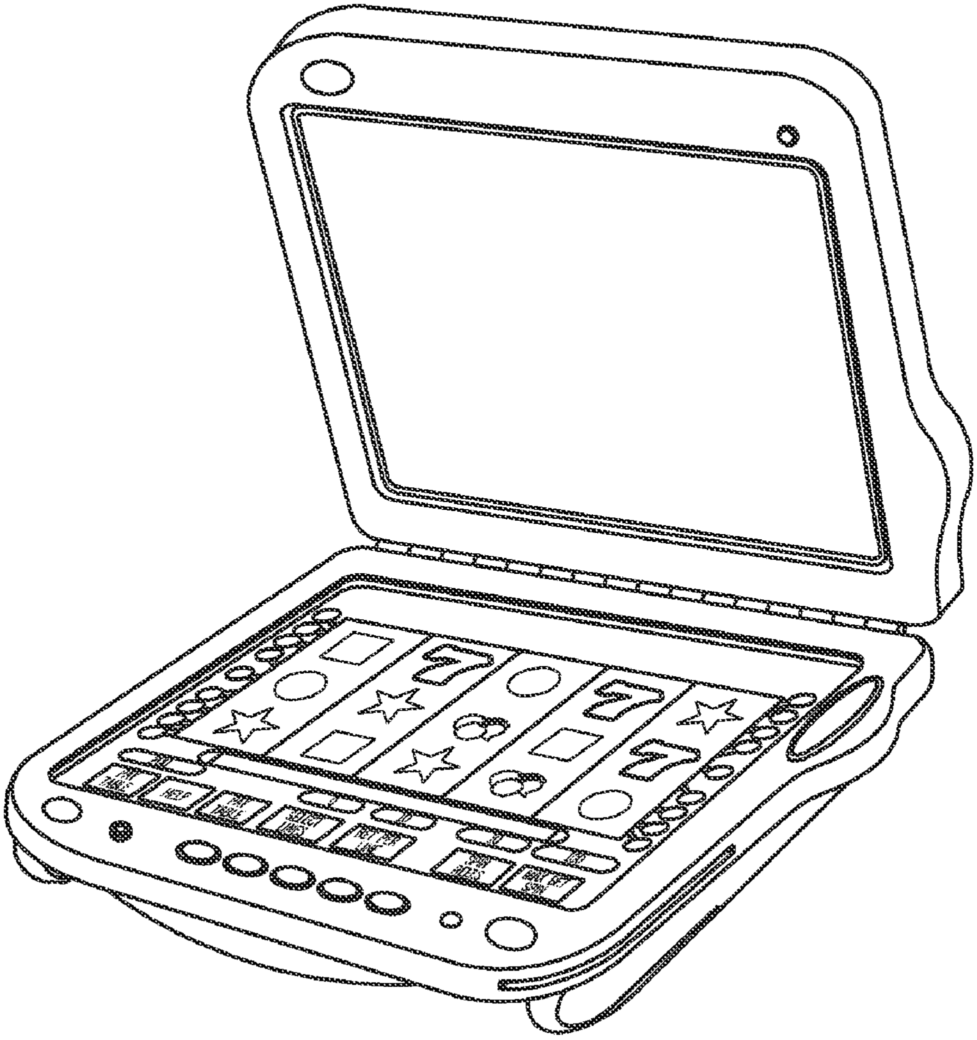
FIG. 1B PRIOR ART
FIG. 1*b* is a perspective view of a handheld gaming terminal.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, e-mails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1*b* illustrates a portable or handheld device primarily used to display and/or conduct wagering games. The handheld device may incorporate the same features as the gaming terminal 10 or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
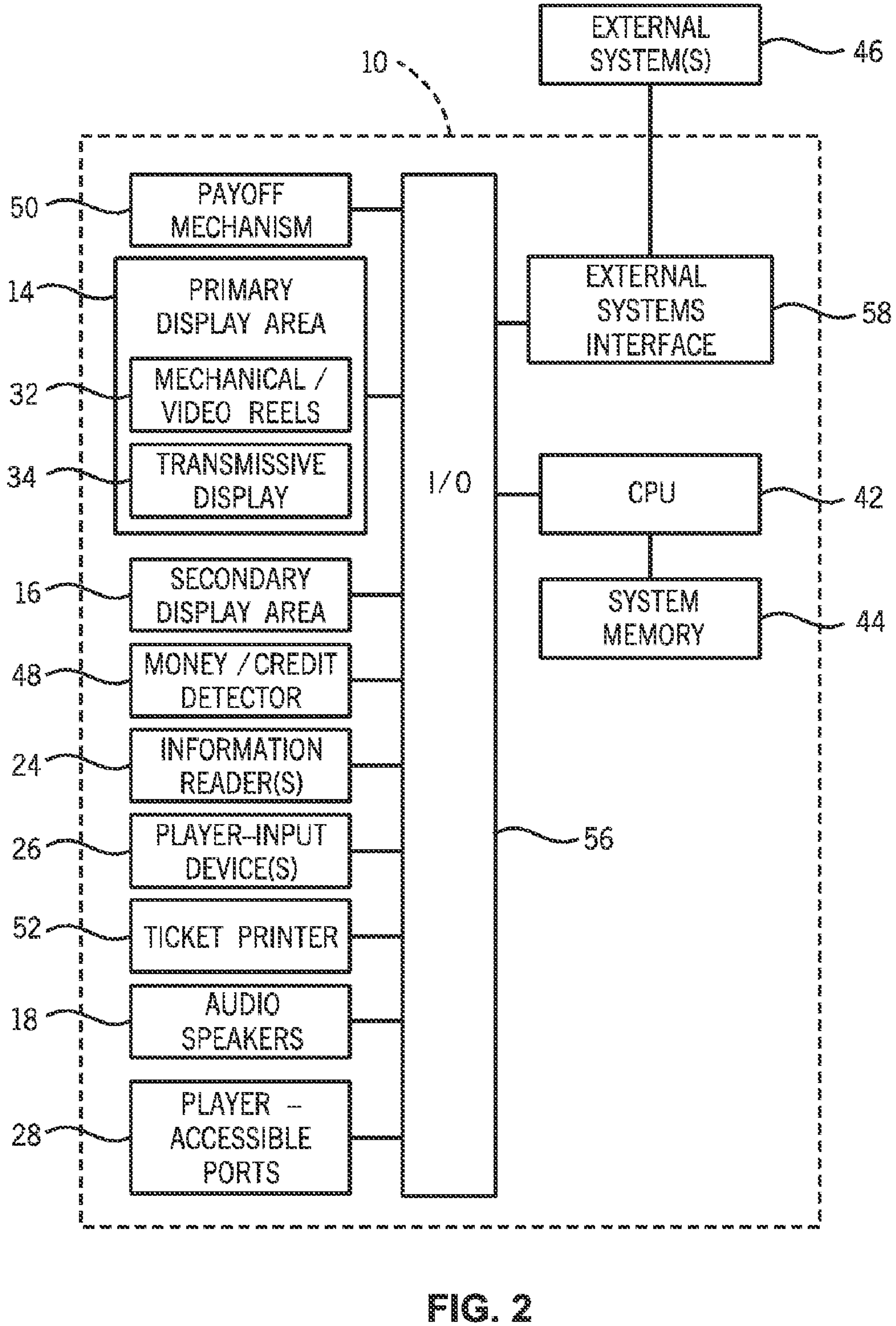
FIG. 2 PRIOR ART
FIG. 2 is a schematic view of a gaming system.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game (s), or via an external game or event. The payoff may be provided in the form of money, redeemable points, services, or any combination thereof. Such payoff may be associated with a ticket (from a ticket printer 52), portable data unit (e.g., a card), coins (from a coin outlet 54 shown in FIG. 1*a*), currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
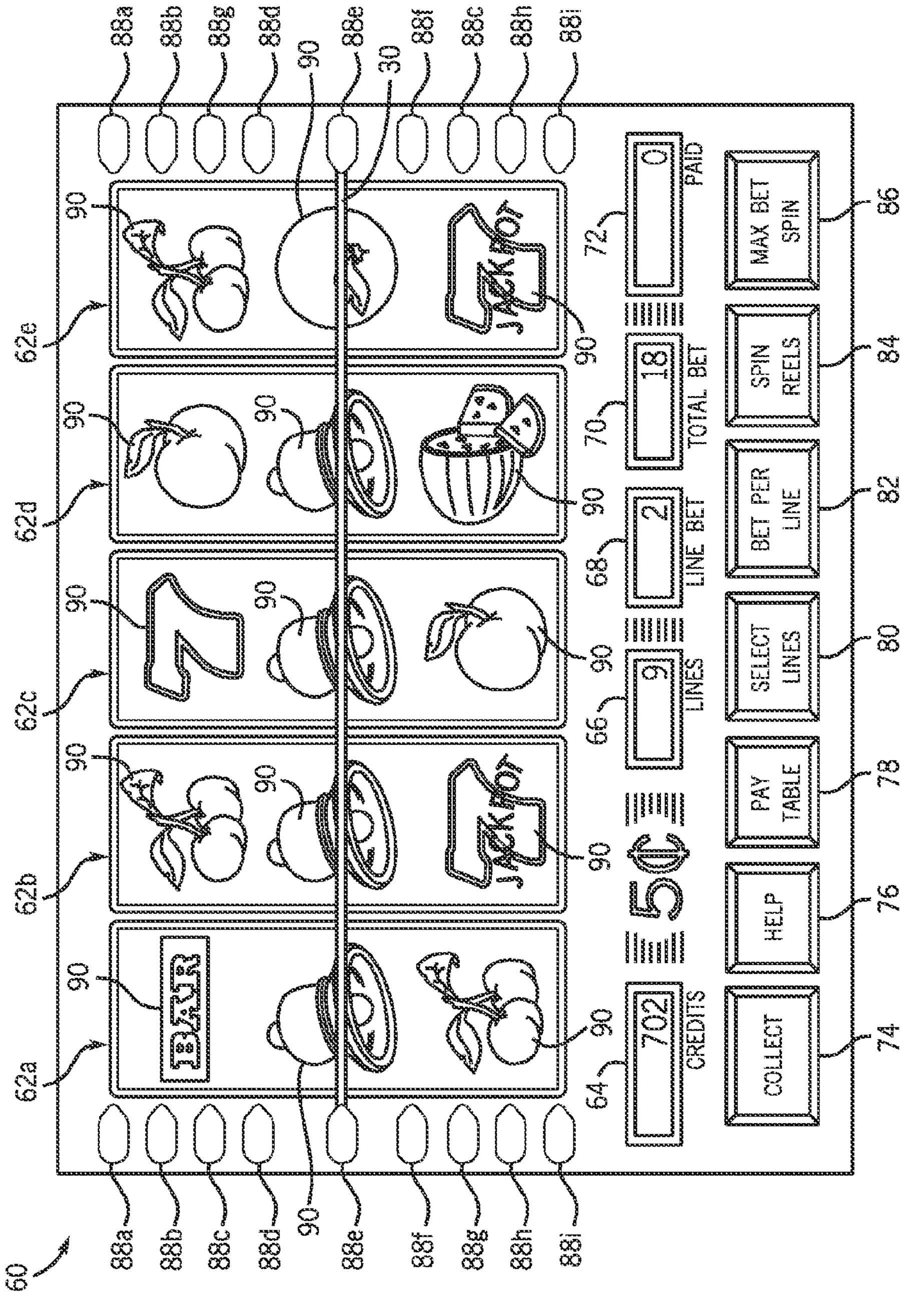
FIG. 3 PRIOR ART
FIG. 3 is an image of a basic-game screen of a wagering game that may be displayed on a gaming terminal.

Referring now to FIG. 3, an image of a basic-game screen 60 adapted to be displayed on the primary display area 14 is illustrated, according to one disclosed example. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager that is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
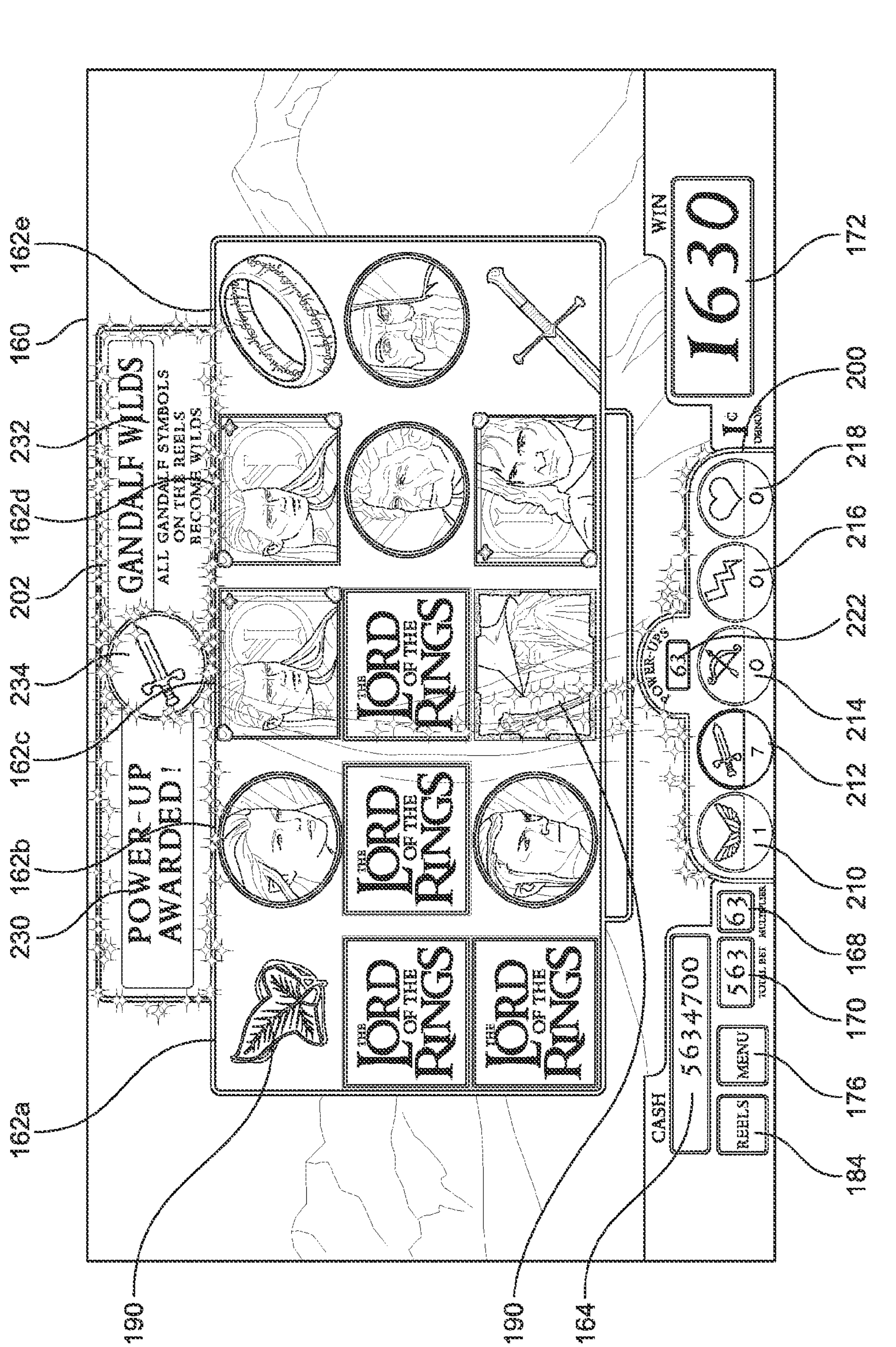
FIG. 4 is an image of a basic-game screen that displays the special feature menu for player selection of powerups.

Turning now to FIG. 4, a game enhancement feature including powerups is shown, according to one disclosed example, in relation to a second example of a themed basic-game screen 160 adapted to be displayed on the primary display area 14 in FIG. 1. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements in FIG. 1.

In FIG. 4, the basic-game screen 160 on the primary display area 14 portrays a plurality of simulated movable reels 162*a-e*. Alternatively or additionally, the basic-game screen 160 may portray a plurality of mechanical reels. The basic-game screen 160 may also display a plurality of game-session meters and various buttons adapted to be actuated by a player.

In the illustrated embodiment, the game-session meters include a "credit" meter 164 for displaying a number of credits available for play on the terminal; a "line bet" meter 168 for displaying a number of credits wagered (e.g., from 1 to 5 or more credits) for each of the number of paylines played; a "total bet" meter 170 for displaying a total number of credits wagered for the particular round of wagering; and a "paid" meter 172 for displaying an amount to be awarded based on the results of the particular round's wager. The user-selectable buttons may include a "menu" button 176 for viewing instructions on how to play the wagering game and other screens for other player controls and a "spin reels" button 184 for moving the reels 162*a-e*. While the gaming terminal 10 allows for these types of player inputs, the present example does not require them and can be used on gaming terminals having more, less, or different player inputs.

A plurality of symbols 190 is displayed on the plurality of reels 162*a-e* to indicate possible outcomes of the basic wagering game. A winning combination occurs when the displayed symbols 190 correspond to one of the winning symbol combinations listed in a pay table stored in the memory 44 of the terminal 10 or in the external system 46. The symbols 190 may include any appropriate graphical representation or animation, and may further include a "blank" symbol. In this example, the theme of the basic-game is based on LORD OF THE RINGS and the symbols 190 are based on characters and objects relating to LORD OF THE RINGS. The basic-game screen 160 includes a powerup menu 200 at the bottom edge of the screen and a banner 202 along the top edge of the screen.

The powerup menu 200 includes a set of powerup icons 210, 212, 214, 216, and 218. Each of the powerup icons 210, 212, 214, 216, and 218 includes a number which shows the number of such powerups available to the player. For example, the powerup icon 212 shows a "seven" indicating that the player has accumulated seven such powerups. The powerup icon 210 has a "one" indicating that the player has accumulated one such powerup. The powerup icons 214, 216, and 218 show a zero indicating the player has not accumulated any of the powerups of those types. Each powerup type represented by the powerup icons 210, 212, 214, 216, and 218 has a specific associated game enhancement for future spins when the powerup is activated.

In this example, the Bonus Boost powerup icon 210 results in an external Bonus symbol that causes only two Bonus triggers to be necessary to trigger a Bonus outcome on the reels 162*a-e*. The Symbol Wilds powerup icon 212 makes all symbols of a certain type such as GANDALF, SWORD, or FRODO change to WILD symbols. The Random Reels Wild powerup icon 214 makes the symbols 190 on one to four reels 162*a-e*, wild symbols for the subsequent spin. The All Wins at X powerup icon 216 makes all wins pay at 2×-10×. If the bonus triggers on a spin with the All Wins at X powerup active, the bonus is also multiplied. The ScatterSpin powerup icon 218 results in all pays paid as scatter pays and no line pays.

Throughout the basic-game, randomly following, prior to, or during a spin of the reels 162*a-e*, the player may be awarded a "powerup" feature from the icons 210, 212, 214, 216, and 218 of the powerup menu 200. The powerups may vary in terms of types of powerups awarded and amounts of powerups awarded. Alternatively, one single type of powerup in a fixed amount may be awarded per spin. The amount of powerups awarded is preferably a multiple of the number of credits wagered per payline. For example, a mystery outcome in the basic-game based on a player wagering four credits per payline may award four All Wins at X powerups, four Random Reels Wild powerups, and four ScatterSpin powerups. In one embodiment, the types of powerups available to a player increases as the player's wager increase. For example, if a player wagers only one credit per payline the player may only be eligible to win the Bonus Boost powerup, whereas if the player wagers two credits per payline, the player may be eligible to win both or either of the Bonus Boost powerup or the Symbol Wilds powerup. In this alternative, if the player wagers a maximum number of credits, all of the different types of powerups are available to be awarded. Of course, less than all of the types of powerups are available when a player wagers less than the maximum number of credits The powerups features available to a player are displayed in the menu 200 that allows player access to available powerups anytime prior to a spin for a future play of the basic-game.

The powerups allow a player to apply a game enhancement to any future spin of the reels 162*a-e*. In the example shown in FIG. 4, the powerup selected is represented by the Wilds powerup icon 212. The powerup represented by the Wilds powerup icon 212 will make a specific symbol type on the reels 162*a-e* transform to a WILD symbol. In this example, the specific symbol type is a GANDALF symbol.

Before any spin, the player may choose to activate the powerup by touching the icon representing the powerup on the powerup menu 200. Alternatively, the player may activate a powerup on the mechanical button panel such as the soft touch keys 40 in FIG. 1. In this example, the number of powerups required for activation of the associated game enhancement feature is equal to the player's bet per line in the basic-game. If a player hasn't collected enough powerups to use at their current bet level, those powerups will not be available for activation. In the example shown in FIG. 4, the player has wagered four credits per payline and therefore the Wilds powerup icon 212 is available while the power icons 210, 214, 216, and 218 are grayed out because the player does not have a sufficient number of powerups to activate the game enhancement features. Specifically, the Bonus Boost powerup is not available to the player to activate because the player has only accumulated one Bonus Boost powerup and therefore the Bonus Boost icon 210 is grayed out. If the player only wagered one credit per payline, the icon 210 representing the Bonus Boost powerup would be activated as well, allowing the player to choose between the Wilds powerup icon 212 and the Bonus Boost powerup icon 210.

Once a powerup is activated such as the Wilds powerup as shown by the highlighted powerup icon 212, the reels 162*a-e* may be spun and the game enhancement associated with the activated powerup will be applied to the result of the spin. Depending on the nature and type of powerup, the powerup may be displayed before, during, or after the reels have spun, but prior to the evaluation of the symbols 190 on the reels 162*a-e*.

In this example, when powerups are awarded, the number of powerups awarded is equal to the player's bet per line. Thus, the player may be offered anywhere from one to five powerups in this example corresponding to the number of bets per line the player has wagered. When the player uses accumulated powerups, they must use a number of powerups equal to their bet per payline. If a player doesn't have enough powerups to match their current bet per payline, the icon associated with the powerup will be grayed out on the powerup menu 200 such as icons 210 or 214 in FIG. 4. A player touching the grayed out powerup icon such as the icon 214 will trigger a message stating that they need to adjust their bet per line to use the powerup or collect more powerups of that type.

In this example, the powerups are randomly chosen when they are awarded. Thus, although only five types of powerups are shown in FIG. 4, additional powerups with associated different game enhancement features may be offered. The list of available powerups may grow as the player moves through the basic-game and/or associated bonus games. Alternatively, certain types of powerups available to a player may be replaced by other types of powerups as a player progresses through the basic-game. Certain powerups may only be available to players who have reached certain waypoints on a map (not shown) associated with a player's progression hitting certain symbols or benchmarks of the LORD OF THE RINGS theme in the basic-game.

The powerup menu 200 includes a meter 222 that shows the current expected value in credits of the powerups currently available to the player. The expected value (EV) in credits of the powerup features will not fluctuate during the game in this example. However, as an alternative in games such as episodic games, the EV in credits of the powerup features may increase or decrease. Each of the enhancements associated with a powerup has an EV amount attached to it. The meter 222 above the powerup icons 210, 212, 214, 216, and 218 shows the total amount of EV the player currently has in powerups. In this example, the player has 63 credits in expected value in the powerups displayed in the meter 222 of the powerup menu 200.

In one alternative, certain powerups may have higher EVs than other powerups. In such a case, the higher EV powerups are less likely to be awarded than lower EV powerups. The average EV of all available powerups is constant in one embodiment, though in other embodiments the average EV may be allowed to vary.

Each powerup also has an associated descriptive banner such as the banner 202 that appears above the reels 162*a-e* while the powerup is active as shown in FIG. 4. As shown in FIG. 4, touching the powerup icon such as the powerup icon 212 on the powerup menu 200 triggers the display of the banner 202 above the reels 162*a-e*. Touching the icon 212 again will de-activate the powerup and the banner associated with the powerup such as the banner 202 will disappear. Touching a different powerup icon will activate the second powerup and de-activate the first one resulting in the display of a different banner above the reels 162*a-e*. Only one powerup may be active on any spin. If the reels 162*a-e* are spun while a powerup is activated, the game enhancement associated with the powerup will be applied to that spin, and the number of powerups used are removed from the powerup menu 200. The expected value shown in the meter 222 is also changed to reflect the expected value of the remaining powerups.

In this example, the player has selected the GANDALF bonus powerup by selecting the icon 212. The associated banner 202 includes a powerup notification 230, a powerup explanation 232, and a second powerup icon 234 that represents the selected powerup. The powerup notification 230 notifies the player that the selected powerup is active for the spin. The powerup explanation 232 in this example informs the player that all GANDALF symbols appearing on the reels 162*a-e* are transformed to a WILD symbol. The powerup icon 234 is identical to the selected icon 212 and serves to further indicate the type of powerup activated.

Figure 5:
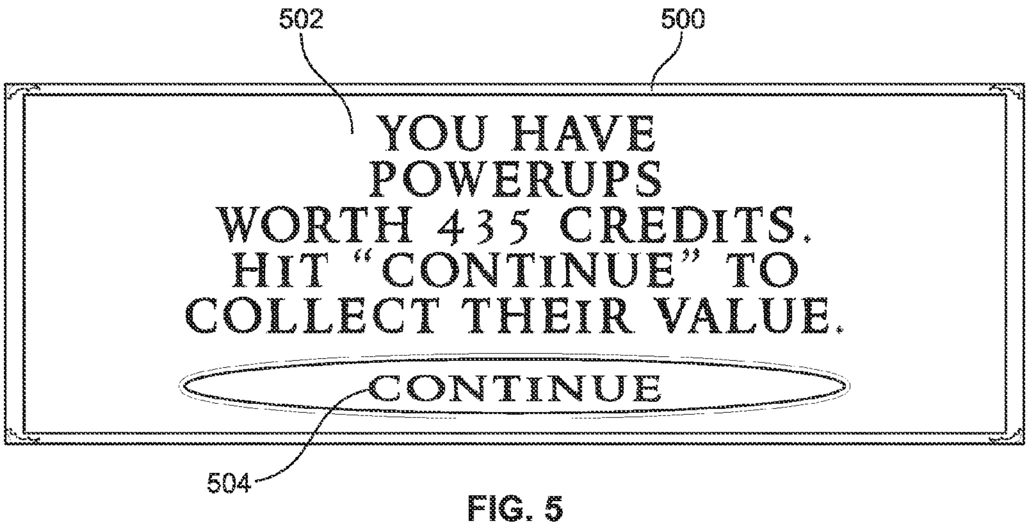
FIG. 5 is an image of the game screen with a meter showing the total credit amount of expected value a player has in power-ups.

FIG. 5 shows an informational screen 500 that may be displayed in pop-up form over the basic-game screen in FIG. 4 to display the expected value in credits of available powerups when a player decides to cash out and end play of the basic-game. The informational screen 500 includes an expected value indicator 502 that indicates the expected value in credits to the player and a continue button 504 which activates the conversion of powerups to a credit value.

When a player cashes out, or the credit meter drops below the threshold to make a minimum bet in the basic-game, the value of the available powerups may be cashed out as well. This will be done all at once in the LORD OF THE RINGS game in this example, but another game may allow the player to convert a portion of their powerups to credits at any one point during the game. Alternatively, assuming a player identification is entered, the powerups may stored and associated with the player identification to be carried over to future games played by the player.

Figure 6:
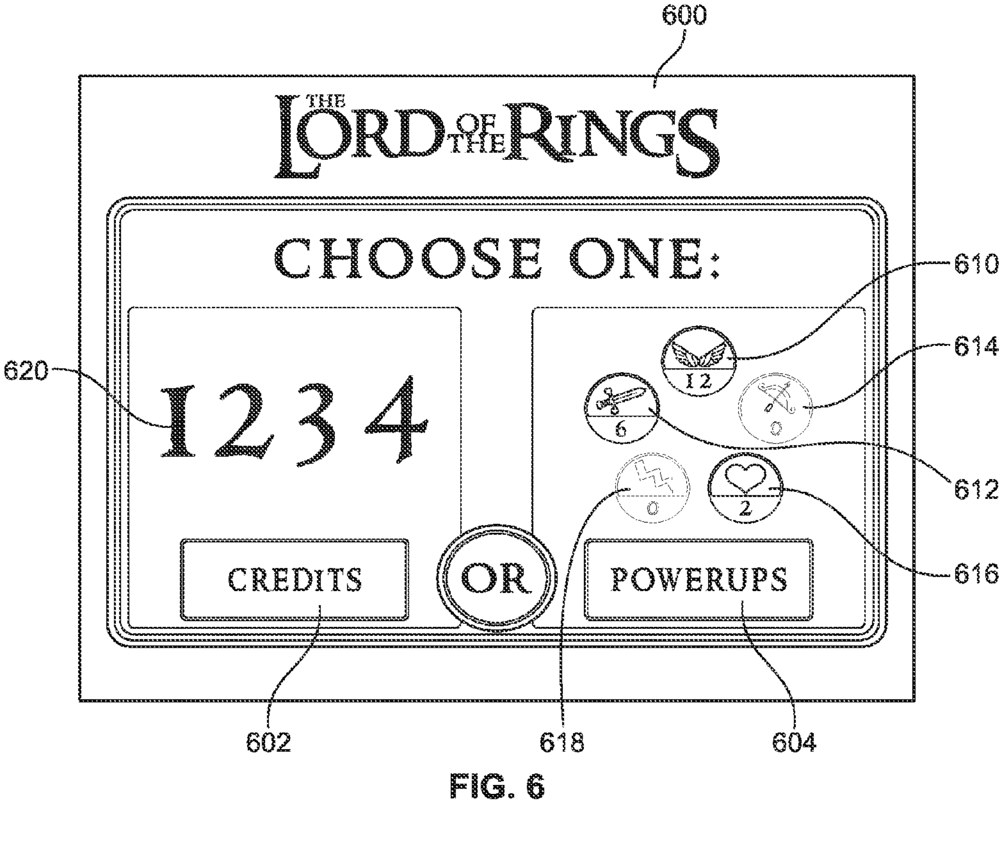
FIG. 6 is an image of a summary game screen that provides a player a choice of a credit award or game powerups.

FIG. 6 shows a cashout selection screen 600 that allows a player to purchase additional powerups. After a bonus award, if the player's win is above a specified threshold, they will be offered the opportunity to receive their award in equivalent powerups. This offer may be presented in a selection screen 600 shown in FIG. 6. The selection screen 600 includes a credits selection button 602 and a powerup selection button 604. The player can then choose to take the credits awarded by selecting the credits selection button 602, or the collection of powerups offered by selecting the powerup selection button 604. A series of powerup icons 610, 612, 614, 616, and 618 is displayed above the powerup selection button 604. The powerup icons 610, 612, 614, 616, and 618 correspond to different powerups as explained above. The powerup icons available to the player for the available credits are highlighted such as the icons 610, 612, and 616. Therefore in this example, rather than receiving 1234 credits, the player may receive six Symbol Wild powerups, twelve All Wins At X powerups and two Scatter Spin powerups. Certain powerups may require additional credits and are unavailable to the player in this example. Other powerups may not be associated with the random selection of powerups offered to the player in exchange for the credits. The icons associated with such unavailable powerups are grayed out such as the icons 614 and 618 in FIG. 6. A number of credits indicator 620 is displayed above the credits button 602. In this example, the only place in the game where a player has the opportunity to "purchase" powerups is in the cash out phase. Throughout the rest of the game, the powerups are awarded as a mystery prize.

Alternatively, an offer of this type in FIG. 6 could be awarded after every win or after a win exceeding a certain threshold (both in the base game). The EV of the offered powerups may be more than, less than, or equivalent to the credit award to provide the player additional opportunities. The offered powerups may be randomly selected by the processor or may be selected by the player. A player may therefore be allowed to select the specific powerup as well as the amount of powerups in lieu of a credit award.

Figure 7:
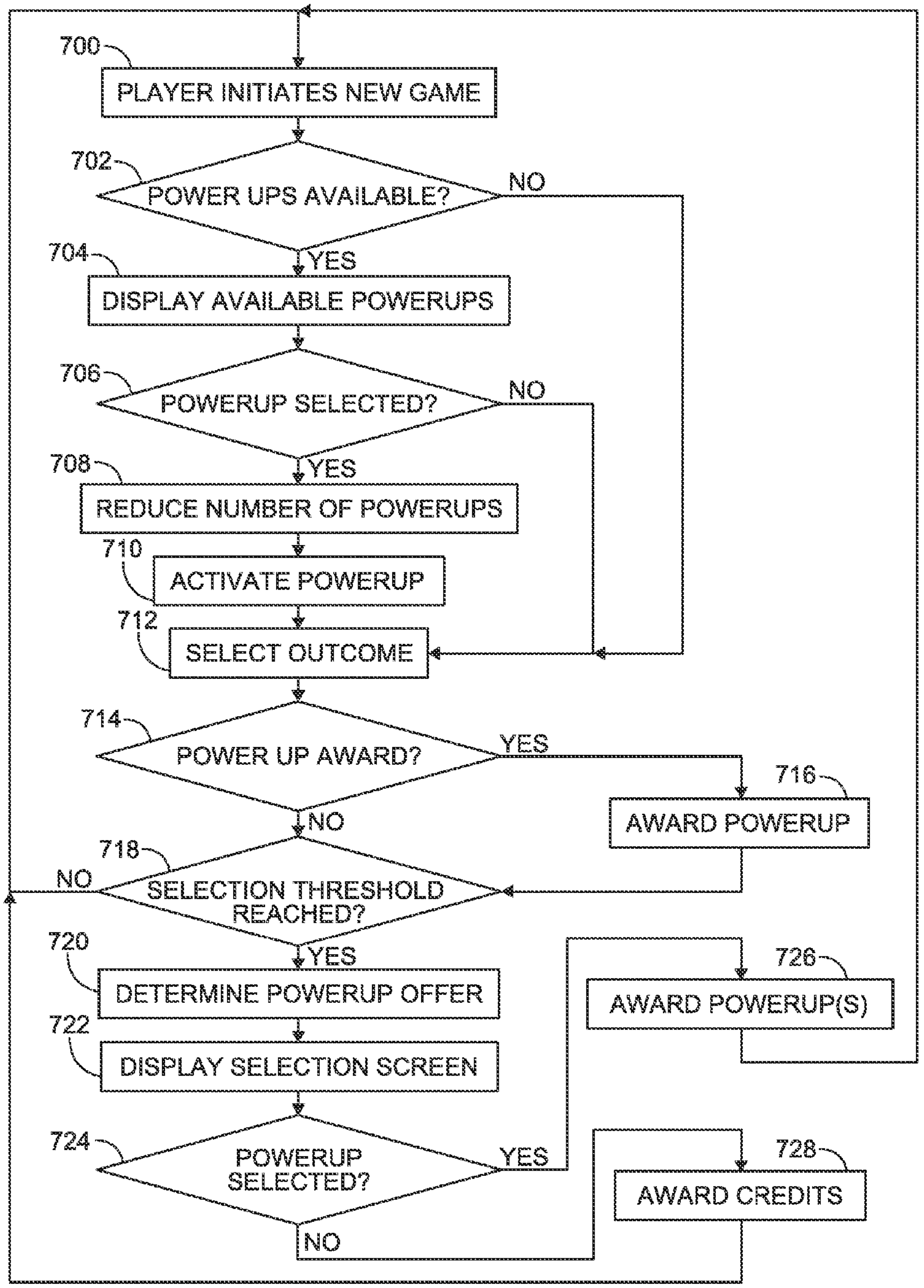
FIG. 7 is a flowchart for an algorithm that corresponds to instructions executed by a controller in accord with at least some aspects of the disclosed concepts.

FIG. 7, described by way of example above, represents one algorithm that corresponds to the at least some instructions executed by the controller 42 and/or external systems 46 in FIG. 2 to perform the above described functions associated with the disclosed concepts. A player initiates the play of the basic-game shown in FIG. 4 (700). The play is initiated by accepting, at a user interface device such as the player input devices 26 in FIG. 1, a player input and transforming the player input into electronic data signals indicative of a wager to play the wagering game. At least one of the gaming apparatus processors such as the controller 42 in FIG. 2 interprets the wager from the data signals and, at least in part, causes the recording of a digital representation of the wager in at least one of the gaming apparatus storage devices such as the memory 44. At least one of the gaming apparatus processors such as the controller 42 initiates the game sequence of the wagering game on the gaming apparatus such as the gaming terminal 10. The user interface device such as the player interface 26 activates the wagering game.

The wagering game sequence includes determining whether any powerups are available for the player (702). If powerups are available, the wagering game activates the powerups menu as shown in FIG. 4 to display the available powerups to the player (704). The wagering game then determines whether a player has selected a powerup (706). If a powerup is selected, the number of available powerups is reduced (708). The powerup is then activated for the wagering game (710).

After the determination of whether a powerup is available (702) and selected (706), a random outcome is determined for the wagering game such as the basic-game shown in FIG. 4 (712). The wagering game creates the random outcome to decide whether an award is awarded and applies any selected powerup to the outcome (712). The algorithm then decides whether a powerup is awarded (714). If a powerup is awarded, the algorithm assigns the player the type of powerup and the amount of powerups (716).

The algorithm then determines whether a selection threshold has been reached (718). Typically the selection threshold is a set number of winning credits from the random outcome. If selection threshold is not reached either because there was not a winning outcome or the number of credits awarded was insufficient, the algorithm loops back to allow the player to initiate another game (700). If the winning credits exceed the threshold, the algorithm determines a powerup award (720). The powerup award may include different types and amounts of powerups. The powerup award may be equivalent in expected value as the credit award or may differ. The algorithm then offers a player the choice between the credit award and additional powerups by displaying a selection screen (722). The player selects between credits and additional powerups via the selection screen such as shown in FIG. 6. The algorithm then determines whether credits or the powerups are selected (724). If the player selects a powerup, the powerups are awarded to the player (726) and the meter 222 and icons in the powerup menu 200 in FIG. 4 are adjusted accordingly to reflect the additional powerups. If the player selects the credits, the credits are awarded to the player (728).

Each of these embodiments and obvious variations thereof is contemplated as falling within the spirit and scope of the claimed invention, which is set forth in the following claims.

What is claimed is:

1. A gaming system comprising:

a wager input for receiving a wager from a player to play a single play of a wagering game;

at least one display to display a plurality of reels with symbols; and a controller coupled to the wager input and the at least one display, the controller operative to:

randomly generate an outcome of the wagering game from a plurality of wagering game outcomes;

display the randomly generated wagering game outcome on the plurality of reels, wherein the plurality of outcomes includes the award of a powerup to a player, wherein a game enhancement feature is associated with the powerup;

save the powerup for activation by a player prior to a future play of the wagering game; and allow the player to activate the saved powerup prior to a future play of the wagering game, and applying the associated game enhancement feature to the future play of the wagering game if the powerup is activated.

2. The gaming system of claim 1, wherein the powerup is one of a plurality of different types of powerups, each of the powerups having an expected value.

3. The gaming system of claim 2, wherein the expected value of the powerup is displayed in a meter.

4. The gaming system of claim 2, wherein the different types of powerups are accumulated in the wagering game for application to the future play of the wagering game.

5. The gaming system of claim 4, wherein the display displays a menu displaying the different types of powerups accumulated by a player.

6. The gaming system of claim 1, wherein the wager input device allows the player to wager a variable number of credits and wherein the controller awards an amount of powerups based on the variable number of credits wagered.

7. The gaming system of claim 6, wherein the game enhancement feature may be activated if the player accumulates a predetermined number of powerups and depends on the variable number of credits the player wagers in a future game.

8. The gaming system of claim 1, wherein the wager input device allows the player to wager a variable number of credits and wherein only certain types of powerups are awarded based on the variable number of credits wagered.

9. The gaming system of claim 1, wherein the plurality of outcomes includes awarding the player a credit award and wherein the controller is operative to offer a player a selection between the credit award or additional powerups.

10. The gaming system of claim 1 wherein the game enhancement feature includes one of converting one of the symbols into a wild symbol, an award multiplier, a scatter symbol award, or additional bonus symbols.

11. A gaming system comprising:

a wager input for receiving a wager from a player to play a single play of a wagering game;

at least one display to display a plurality of reels with symbols;

a controller coupled to the wager input and the at least one display, the controller operative to:

randomly generate an outcome of the wagering game from a plurality of outcomes including a winning outcome;

display the randomly generated wagering game outcome on the plurality of reels;

award a credit award based on a winning outcome; and a selection mechanism allowing a player awarded a winning outcome to select between the credit award and a powerup associated with a game enhancement, wherein if the player selects the powerup, saving the powerup, allowing the player to activate the saved powerup prior to a future play of the wagering game, and applying the game enhancement to the future play of the wagering game, if the powerup is activated.

12. The gaming system of claim 11, wherein another powerup is awarded as an outcome of the wagering game.

13. The gaming system of claim 11, wherein the powerup has an expected value of credits.

14. The gaming system of claim 13, wherein the expected value of the powerup is different from the value of the credit award.

15. A method of conducting a wagering game on a gaming system, the method comprising:

accepting from a wager input device a wager to play a wagering game;

using at least one of a plurality gaming apparatus processors to initiate a game sequence of the wagering game;

using at least one of the gaming apparatus processors to cause a display device to display a series of reels with symbols showing a randomly generated outcome of a plurality of outcomes of the wagering game, the plurality of outcomes including an outcome to award a powerup, wherein a game enhancement feature is associated with the powerup;

saving the powerup for activation by a player prior to a future play of the wagering game; and allowing a player to activate the powerup prior to a future play of the wagering game, and applying the associated game enhancement feature on the future play of the wagering game if the powerup is activated.

16. The method of claim 15, wherein the player is awarded a winning outcome and is offered a choice between a credit award and the powerup.

17. The method of claim 15, wherein the powerup is one of a plurality of different types of powerups, each of the powerups having an expected value.

18. The method of claim 15, wherein the wager input device allows the player to wager a variable number of credits and wherein only certain types of powerups are awarded based on the variable number of credits wagered.

19. The method of claim 17, wherein all of the plurality of different types of powerups are available to be awarded when the player wagers a maximum number of credits and less than all of the plurality of types of powerups are available when a player wagers less than the maximum number of credits.

20. The method of claim 15, wherein the wager input device allows the player to wager a variable number of credits and wherein an amount of powerups is awarded based on the variable number of credits wagered.

* * * * *